(12) United States Patent
McMahan et al.

(10) Patent No.: US 10,884,021 B1
(45) Date of Patent: Jan. 5, 2021

(54) S-TYPE PITOT TUBE FIELD VERIFICATION GAUGE AND METHOD OF ITS USE

(71) Applicant: Air Hygiene International, Inc., Broken Arrow, OK (US)

(72) Inventors: Andrew McMahan, Broken Arrow, OK (US); Sean Barnes, Broken Arrow, OK (US); Tom Graham, Broken Arrow, OK (US); Jake Fahlenkamp, Broken Arrow, OK (US); Chad Smith, Broken Arrow, OK (US)

(73) Assignee: Air Hygiene International, Inc., Broken Arrow, OK (US)

( * ) Notice: Subject to any disclaimer, the term of this patent is extended or adjusted under 35 U.S.C. 154(b) by 214 days.

(21) Appl. No.: 16/274,640

(22) Filed: Feb. 13, 2019

Related U.S. Application Data

(60) Provisional application No. 62/630,050, filed on Feb. 13, 2018.

(51) Int. Cl.
*G01P 21/00* (2006.01)
*G01P 5/165* (2006.01)

(52) U.S. Cl.
CPC .............. *G01P 21/00* (2013.01); *G01P 5/165* (2013.01)

(58) Field of Classification Search
CPC ................................. G01P 21/00; G01P 5/165
See application file for complete search history.

(56) References Cited

FOREIGN PATENT DOCUMENTS

CN         203629904 U   *   6/2014

OTHER PUBLICATIONS

"Method 2-Determination of Stack Gas Velocity and Volumetric Flow Rate", "40 CFR Appx. A-1 of Part 60", Publisher: EPA.
Williams et al, "A Study on the Accuracy of Type S Pitot Tube", "EPA Grant No. 803168", Jun. 30, 1977, Publisher: EPA.

* cited by examiner

*Primary Examiner* — Jamel E Williams
(74) *Attorney, Agent, or Firm* — Gable Gotwals

(57) ABSTRACT

A verification gauge of this disclosure provides fit-to-pass inspection and visual gauge inspection that may be performed in the field to verify whether an s-type pitot tube falls within predetermined tolerances prior to its use. Verification only requires the gauge. No bench-type vise to hold the tube, no known flat plane (beyond any provided by the block), no protractor, and no accompanying spreadsheet calculations are required. In some embodiments, the verification gauge includes a square or rectangular block that includes four measurement stations or positions that correspond, respectively, to four different tolerances, two relating to face-plane openings and two relating to leg alignments. By positioning the tube within a station, fit-to-pass or visual gage inspection of face-plane openings and leg alignments may be performed.

21 Claims, 11 Drawing Sheets

*(Prior Art)*

(a)

(b)

(c)

(d)

(e)

(f)

(g)

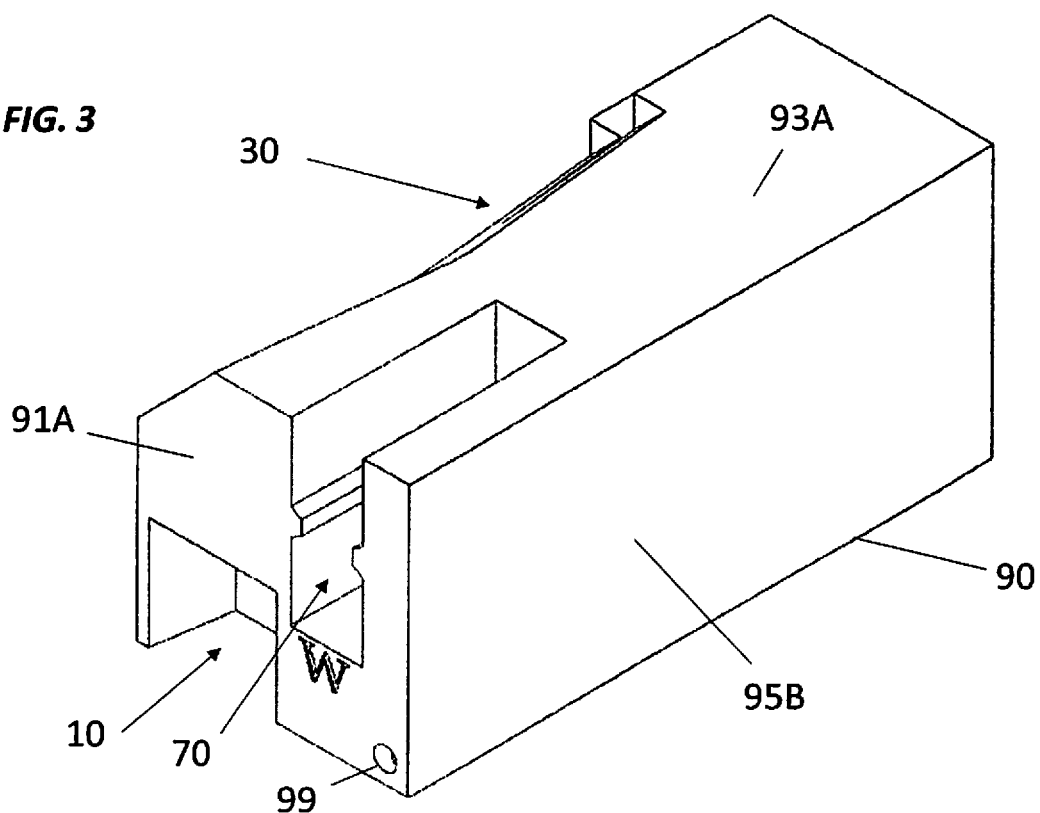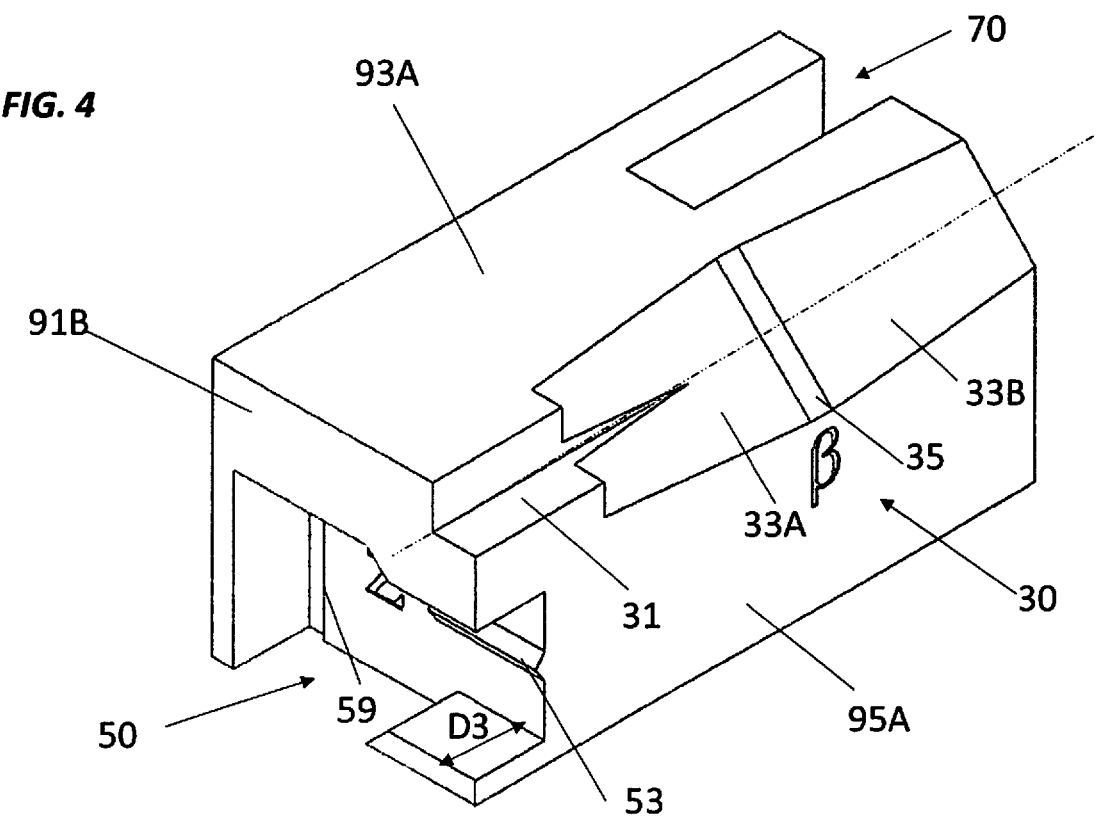

S-TYPE PITOT TUBE FIELD VERIFICATION GAUGE AND METHOD OF ITS USE

CROSS-REFERENCE TO RELATED APPLICATION

The present application is a conversion of U.S. Provisional Application No. 62/630,050 filed Feb. 13, 2018, the subject matter of which is incorporated herein by reference.

FIELD OF THE DISCLOSURE

The present disclosure relates to systems, apparatuses, and methods for verifying s-type pitot tubes remain within a given standard for use in a field application. More particularly, the disclosure relates to systems, apparatuses, and methods that may be used outside of a manufacturing or lab environment to verify whether a measurement device is within acceptable tolerance limits and give a user a quality assurance level at least as high as, if not higher than, lab-based verification or audit approaches.

BACKGROUND

Many accrediting and governing bodies specify standard measurement or testing methodologies along with the required tolerances or measurement standards for the measurement devices used in those methodologies. These measurement standards provide an acceptable deviation from the perfect model. Any deviation of the measurement device can be easily measured in a manufacturing or lab environment and compared to the acceptable deviation. However, measuring actual deviation when at a field location can be very challenging.

One non-limiting example of a standard testing methodology and measurement standard is Environmental Protection Agency's Method 2, Determination of Stack Gas Velocity and Volumetric Flor Rate (Type S Pitot Tube). See 40 CFR Appx. A-1 of Part 60, the content of which is incorporated by reference herein. "The velocity measurement is one of the most critical elements in [emission] source testing because it is used to determine the rate at which gas is drawn into the sampling probe and is also used in calculating the volumetric flow rate." See J. C. Williams, III & F. R. DeJamette, *A study on the accuracy of type-S pitot tubes* at Foreword, EPA Grant No. 803168 (EPA, 1977), the content of which is incorporated by reference herein.

FIG. 1A illustrates the typical s-type pitot tube specified for use in Method 2 and its associated nomenclature. The external tube diameter is typically between 3/16 and 3/8 inch (0.48 to 0.95 cm), with an equal distance from the base of each leg to its face-opening plane or port. This distance is typically between 1.05 and 1.50 times the external tubing diameter. One or both legs may include a second bend toward a threaded end opposite that of the port end. The face openings of the pitot tube should be aligned; however slight misalignments of the openings are permissible. See FIGS. 2A-2G.

To verify whether the s-type pitot tube is within tolerances like those shown in FIGS. 2A-2G, factory-accepted tests for s-type pitot tubes require a bench-type vise to hold the tube, a known flat plane, a protractor, and accompanying spreadsheet calculations, see e.g. FIGS. 1B-1C, none of which are easily found in most field testing locations. Because of the difficulty associated with checking alignment, there is the potential for the face openings to deviate outside of the provided tolerance during use with no chance of knowing this until the pitot tube is returned from the field and audited.

SUMMARY

Embodiments of an s-type pitot tube field verification gauge of this disclosure include a square- or rectangular block having a plurality of measurement stations or positions, each measurement position configured to verify a face-opening planar alignment or a leg alignment of a pitot tube. In embodiments, the gauge provides all of the planes required for verification and no separate "known flat plane" or protractor is needed. The gauge may include two measuring techniques: fit-to-pass inspection and visual gauge inspection.

In an embodiment of the field verification gauge, four different measurement stations or positions are provided. Two of the four measurement positions verify alignment of the face-opening planes relative to a transverse axis of the leg and a longitudinal axis of the leg, respectively. Another two measurement positions verify alignment of the ends of the legs, and therefore the alignment of the face openings, and longitudinal axis alignment of the legs, respectively. In some embodiments, more than one measurement position may be provided on a same face or side of the block. A side may include a fit-to-pass inspection, a visual gauge inspection, or both a fit-to-pass and a visual gauge inspection.

A first measurement station or position may be used to verify whether a first face-opening feature of the s-type pitot tube is within the tolerance $\alpha_1$ and $\alpha_2$, see FIGS. 2A & 2B, by using a pair of recesses designed to only allow tubes that meet the tolerancing limits to fit properly into the recesses provided by the first measurement position. A second measurement station or position may be used to verify whether a second face-opening feature of the s-type pitot tube is within the tolerance $\beta_1$ and $\beta_2$, see FIGS. 2C-2E, by using a gauge surface to compare the outermost acceptable angle to the angle presented by the face of the s-type pitot tube. A third measurement station or position may be used to verify whether a third face-opening feature of the s-type pitot tube is within tolerance Z, see FIG. 2F, by using a holding jig that places the tube in proper position and an indicator line to determine whether the ends of the legs are in alignment with one another. A fourth measurement station or position may be used to verify whether a fourth face-opening feature of the s-type pitot tube is within the tolerance W, see FIG. 2G, by providing a tube insertion location where the s-type pitot tube will not be able to fit if outside of tolerance.

BRIEF DESCRIPTION OF THE DRAWINGS

Embodiments of this disclosure are illustrated as an example and are not limited by the figures of the accompanying drawings, in which like references may indicate similar elements and in which:

FIG. 2A illustrates tolerance $\alpha_1$ relative to a transverse tube axis.

FIG. 2B illustrates tolerance $\alpha_1$ and $\alpha_2$ relative to the transverse tube axis.

FIG. 2C illustrates tolerance $\beta_{1(-)}$ relative to a longitudinal tube axis.

FIG. 2D illustrates tolerance $\beta_{1(-)}$ relative to the longitudinal tube axis.

FIG. 2E illustrates tolerance $\beta_{1(+ \text{ or } -)}$ and $\beta_{2(+ \text{ or } -)}$ relative to the longitudinal tube axis.

FIG. 2F illustrates tolerance Z of an end alignment of the legs at the face opening or port end.

FIG. 2G illustrates tolerance W of a longitudinal alignment of the legs.

FIG. 3 is a front/top/right isometric view of an embodiment of an s-type pitot tube field verification gauge configured to verify whether s-type pitot tubes satisfy the tolerances of FIGS. 2A-2F without the need for a separate known reference plane and protractors.

FIG. 4 is another rear/top/left isometric view of the s-type pitot tube field verification gauge of FIG. 3.

ELEMENTS AND NUMBERING USED IN THE DRAWINGS AND DETAILED DESCRIPTION

Figure 1A:
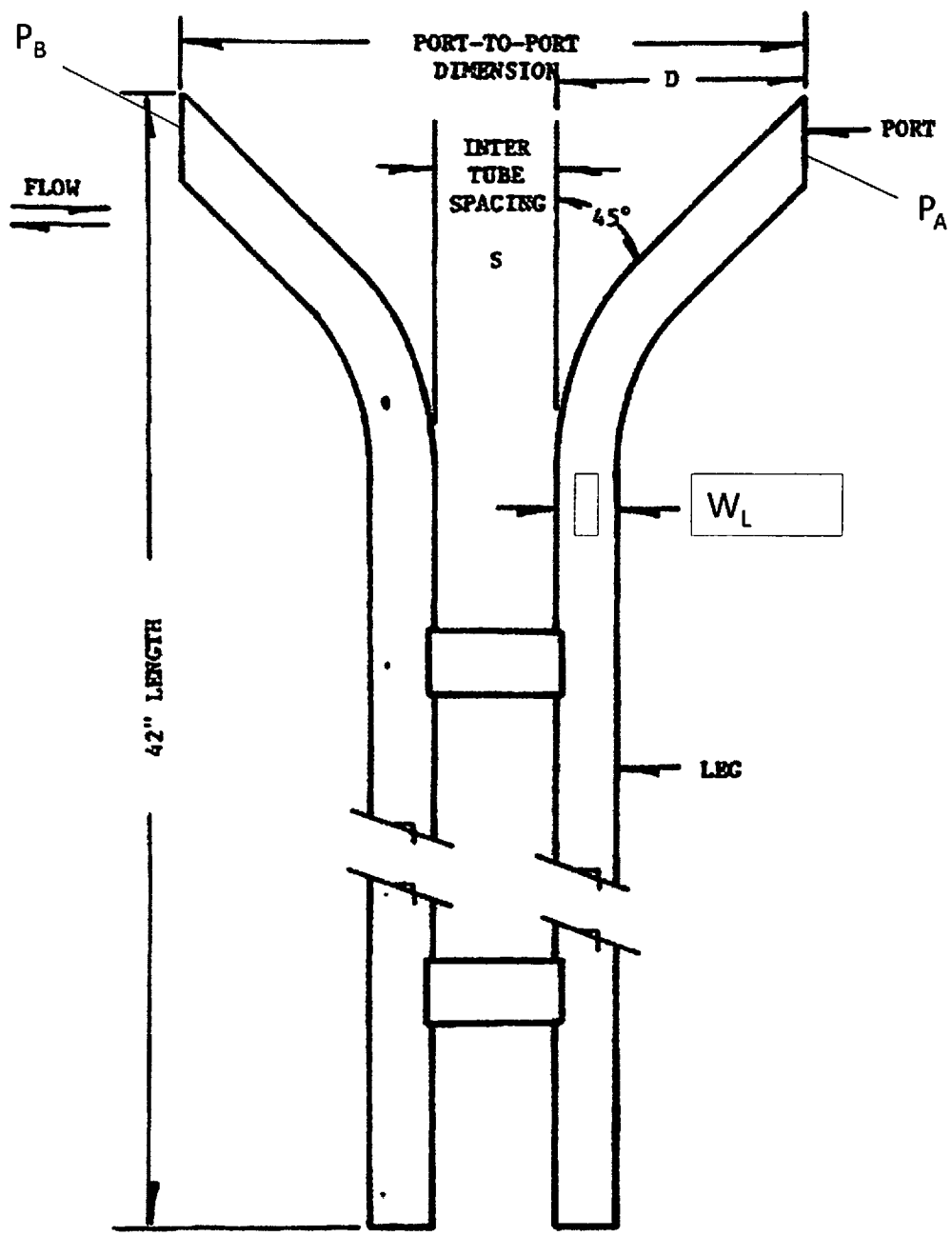
FIG. 1A is a plan view of a prior art s-type pitot tube and its associated nomenclature.

10 First measurement station or position
11 First recess
13 Lower end
15 Upper end
19 Sidewall
21 Second recess
23 Lower end
25 Upper end
27 Centerline
29 Sidewall
30 Second measurement station or position
31 Guide
33 Gauge surface
35 Planar surface
37 Wall
39 Centerline
50 Third measurement station or position
51 Recess
53 Holding jig
55 First end
57 Second end
59 Indicator line
61 Opening
63 Open sidewall portion
65 Centerline
70 Fourth measurement station or position
71 First recess
73 Lower end
76 Waist portion
81 Second recess
83 Upper end
85 Centerline
90 Block
91 Front or rear end surface
93 Top or bottom face surface
95 Left or right side face surface
99 Thru-hole

DETAILED DESCRIPTION

Figure 5:
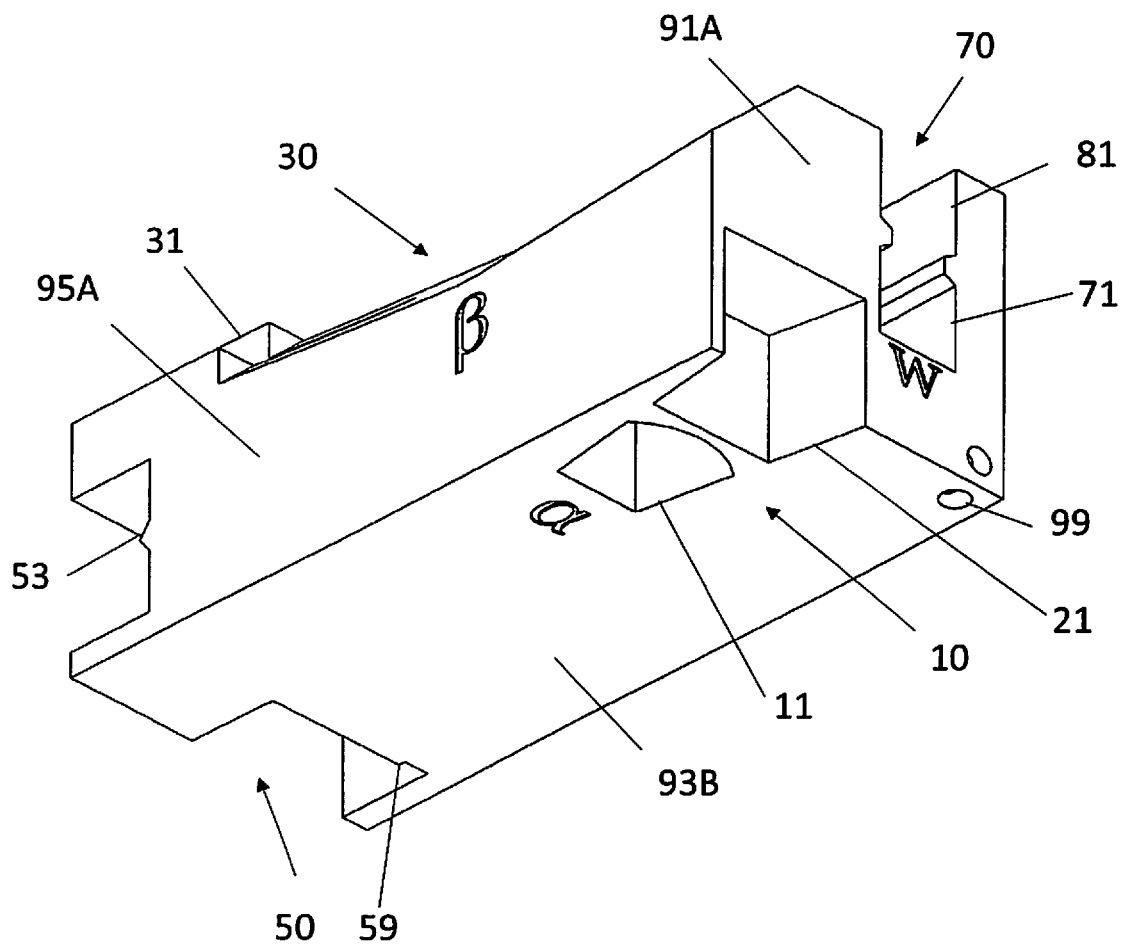
FIG. 5 is a left/bottom/front isometric view of the s-type pitot tube field verification gauge of FIG. 3.
Figure 6:
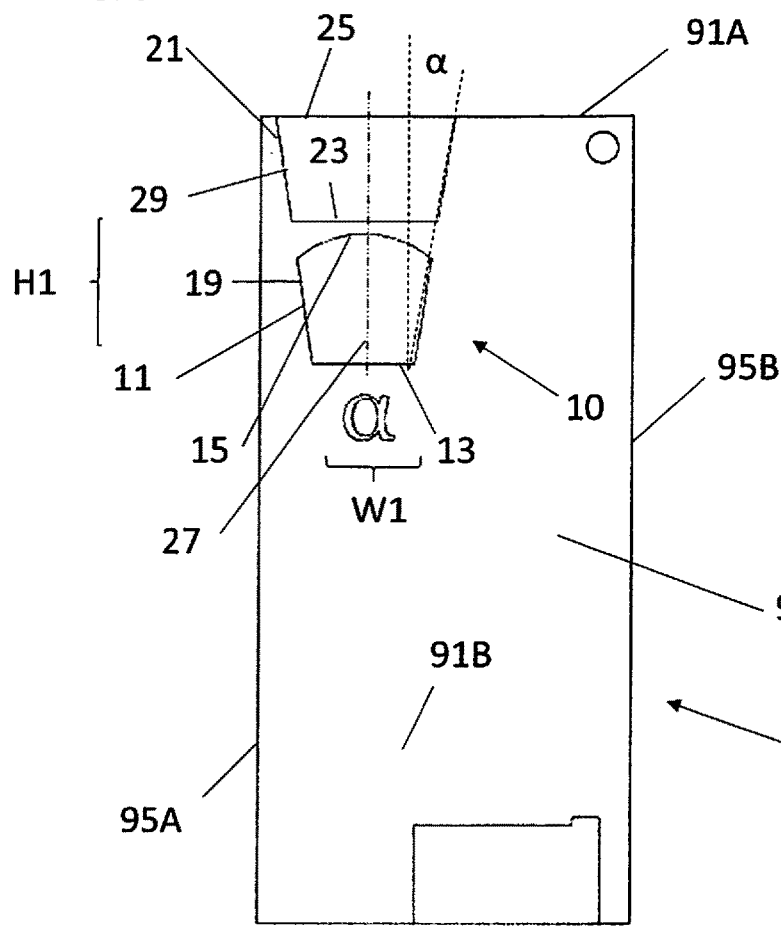
FIG. 6 is a bottom elevation view the embodiment of FIGS. 3-5. A first measurement station or position is used to verify whether a first face-opening feature of the s-type pitot tube is within the tolerance $\alpha_1$ and $\alpha_2$, see FIGS. 2A & 2B, by using a pair of recesses designed to only allow tubes that meet the tolerancing limits to fit properly into the recesses provided by the first measurement position.
Figure 8:
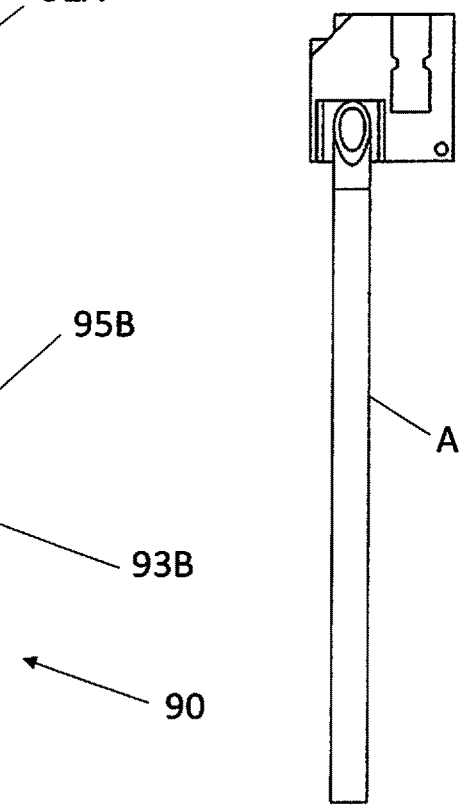
FIG. 8 is a front elevation view of the gauge of FIG. 6 with the s-type pitot tube inserted into the first measurement position.
Figure 7:
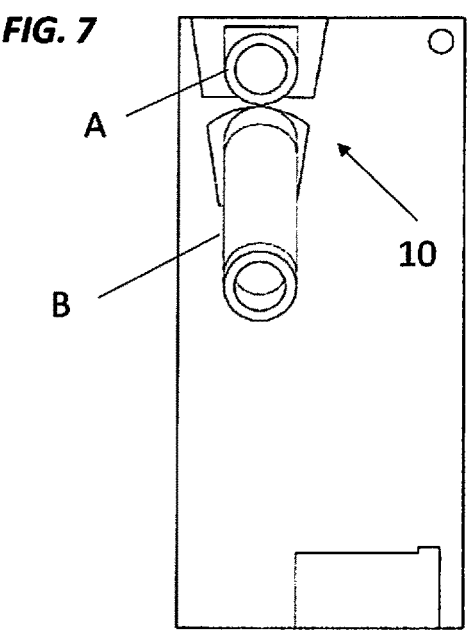
FIG. 7 is a bottom plan view of the gauge of FIG. 6 with an s-type pitot tube inserted into the first measurement position of FIG. 6.
Figure 9:
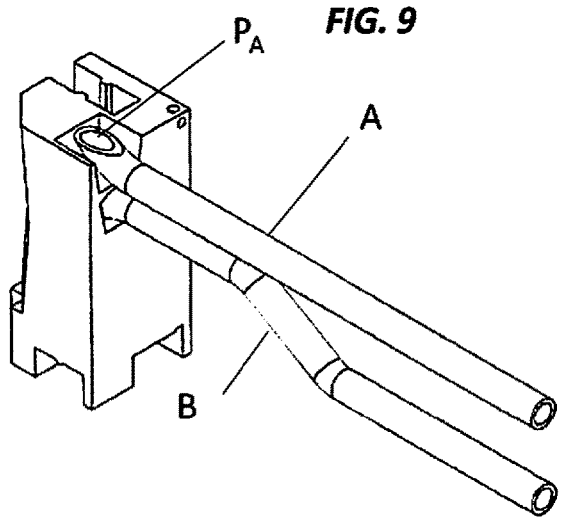
FIG. 9 is a left/bottom/front isometric view of the gauge of FIG. 6 with the s-type pitot tube inserted into the first measurement position.
Figure 10:
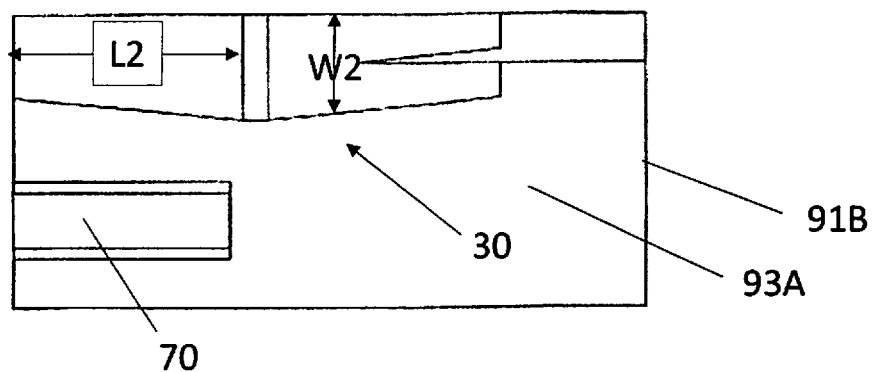
FIG. 10 is a top plan view of the embodiment of FIGS. 3-5. A second measurement station or position is used to verify whether a second face-opening feature of the s-type pitot tube is within the tolerance $\beta_1$ and $\beta_2$, see FIGS. 2C-2E, by using a gauge surface to compare the outermost acceptable angle to the angle presented by the face of the s-type pitot tube. A guide provides a correct alignment of the tube to the gauge surface.
Figure 11:
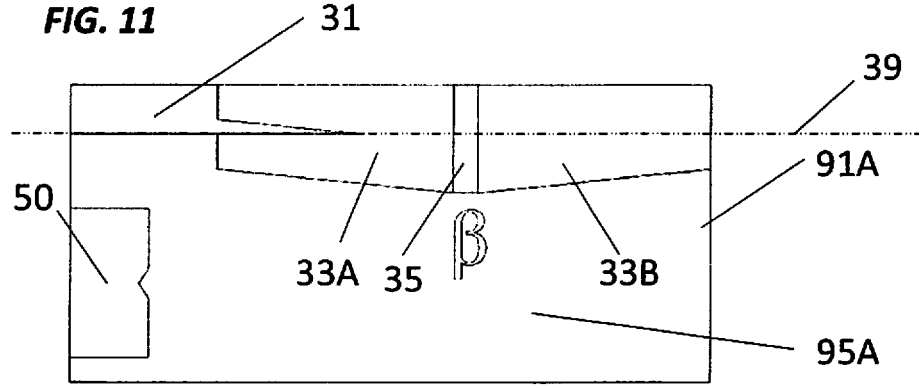
FIG. 11 is a left side elevation view of the gauge of FIG. 10.
Figure 12:
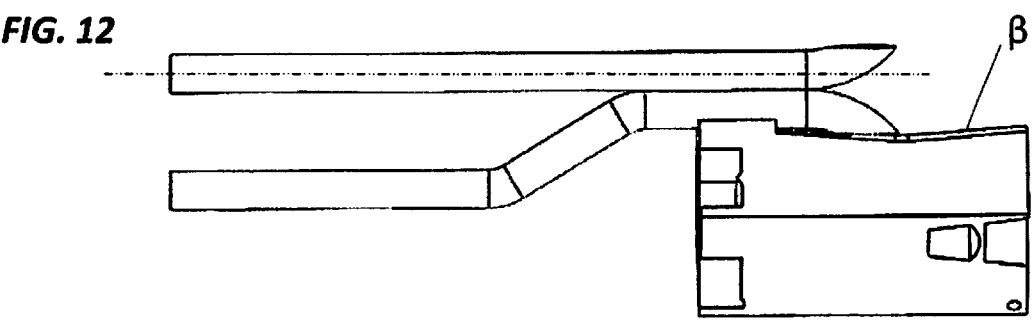
FIG. 12 is a view of the gauge of FIG. 10 along a longitudinal axis of the s-type pitot tube with an s-type pitot tube positioned in the guide and a face opening of one leg being checked relative to the angled surface.
Figure 13:
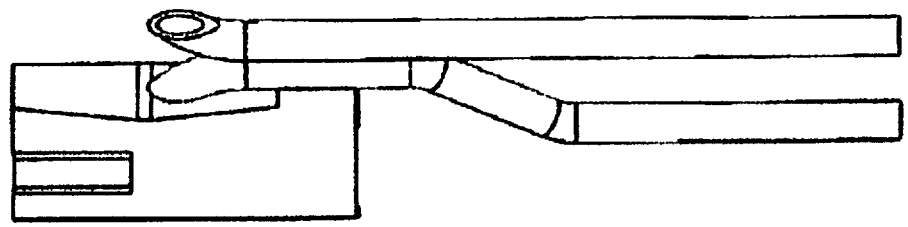
FIG. 13 is a top plan view of the gauge of FIG. 10 with the s-type pitot tube positioned in the guide.
Figure 14:
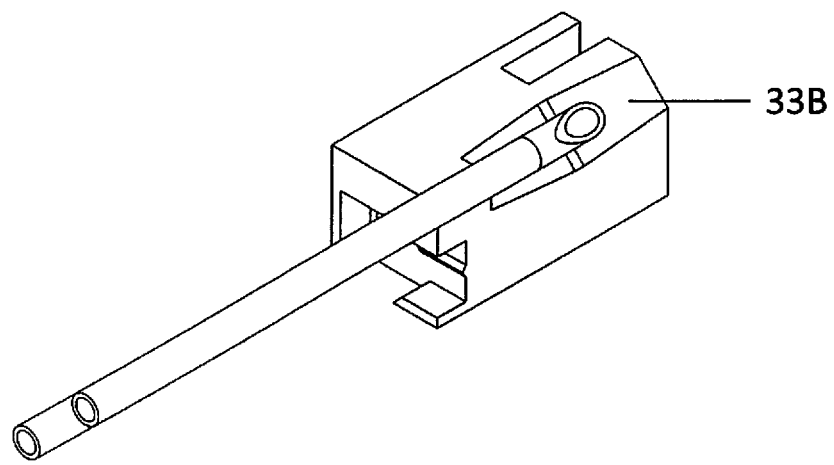
FIG. 14 is a rear/top/left isometric view of the gauge of FIG. 10 with the s-type pitot tube positioned in the guide.
Figure 15:
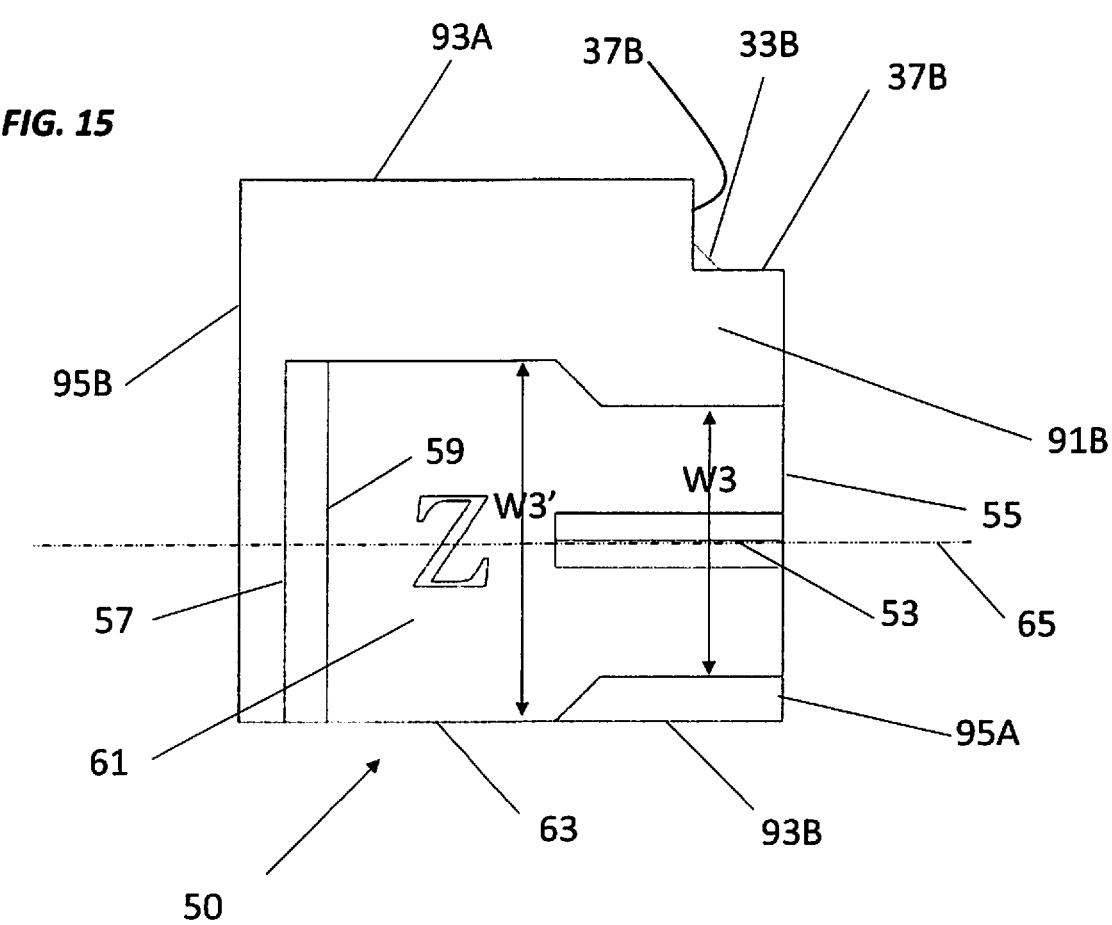
FIG. 15 is a rear elevation view of the embodiment of FIGS. 3-5. A third measurement station or position is used to verify whether a third face-opening feature of the s-type pitot tube is within tolerance Z, see FIG. 2F, by using a holding jig that places the tube in proper position and an indicator line to determine whether the ends of the legs are in alignment with one another.
Figure 16:
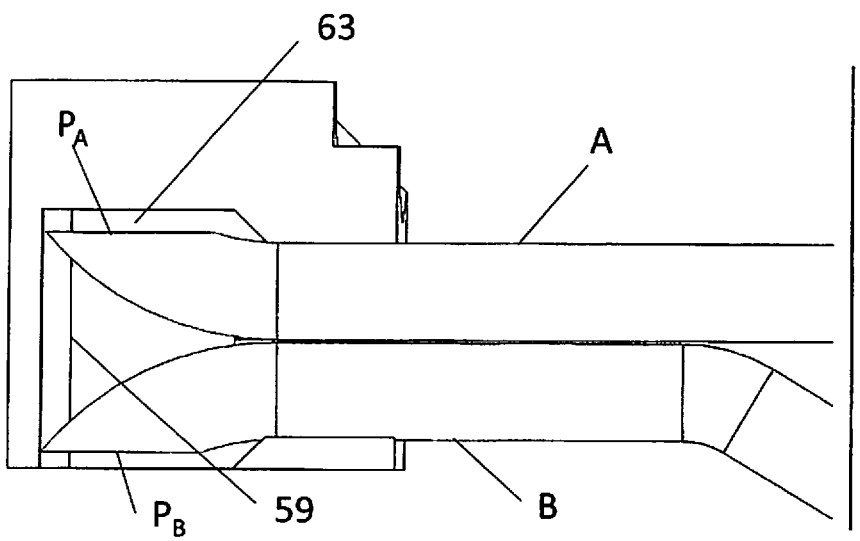
FIG. 16 is an end view of the gauge of FIG. 15 with an s-type pitot tube inserted into the third measurement position.
Figure 17:
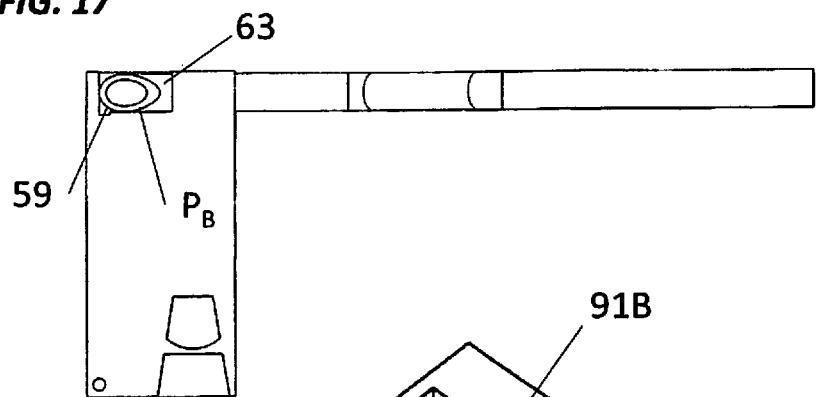
FIG. 17 is a bottom plan view of the gauge of FIG. 15 with the s-type pitot tube inserted into the third measurement position.

Referring first to FIGS. 3-5, embodiments of an s-type pitot tube field verification gauge of this disclosure include a square- or rectangular block 90 having a plurality of measurement stations or positions 10, 30, 50, 70, each measurement station or position configured to verify a face-opening planar alignment or a leg alignment of the pitot tube. The measurement positions 10, 30, 50, 70 allow a user to check four different tolerances. See FIGS. 2A-2G. The block 90 may be made of any material suitable, including but not limited to a plastic or a non-metallic composite material. The block 90 may be made using any suitable process. In some embodiments, the block 90 is 3-D printed or molded. In other embodiments, the block 90 may be machined or include machined surfaces or portions. The block 90 is portable and may be sized to fit in a user's hand. In some embodiments, the block 90 is a rectangle-shape, having a length of about 3¼ inches and a width of about 1½ inches. The block 90 may include a thru-hole 99 for a connecting a lanyard (not shown).

Figure 2A:
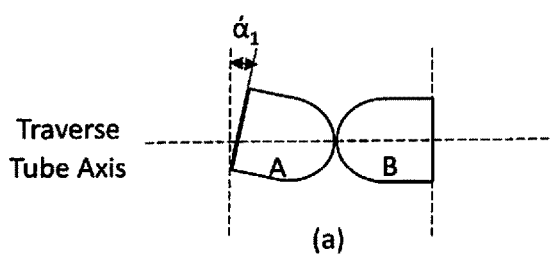
FIGS. 2A-2G illustrate an s-type pitot tube reference method outlined in 40 CFR 60 Appendix A, Method 2, incorporated by reference herein.
Figure 2B:
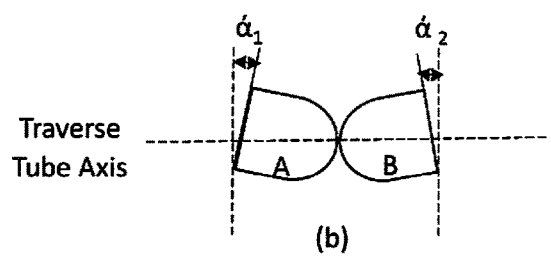

Referring to FIGS. 3-9, a first measurement station or position 10 is used to verify whether a first face-opening feature of the s-type pitot tube is within the tolerance $\alpha_1$ and $\alpha_2$, see FIGS. 2A & 2B, by using a pair of recesses designed to only allow tubes that meet the tolerancing limits to fit properly into the recesses provided by the first measurement position. In some embodiments, the first measurement position 10 checks alignment of a face-opening plane within a range of a1, see FIG. 2A, relative to a transverse tube axis (and assumes that if $\alpha1$ is passed, then $\alpha_2$ is also passed). In some embodiments, a is 10° relative to the transverse tube axis. In other embodiments, a is in range of 9° to 10°. The actual manufactured angle may vary from the target angle within generally accepted tolerance or measurement limits. For example, the manufacturable angle may be 9.25° in order to approximate an angle $\alpha$ of about 10°. When in use, an s-type pitot tube is inserted, port end first, into the first measurement position 10, so that a first face-opening plane $P_A$ (or $P_B$, see FIG. 1A) is checked and then a second face-opening plane $P_B$ (or $P_A$) is checked.

Figure 1B:
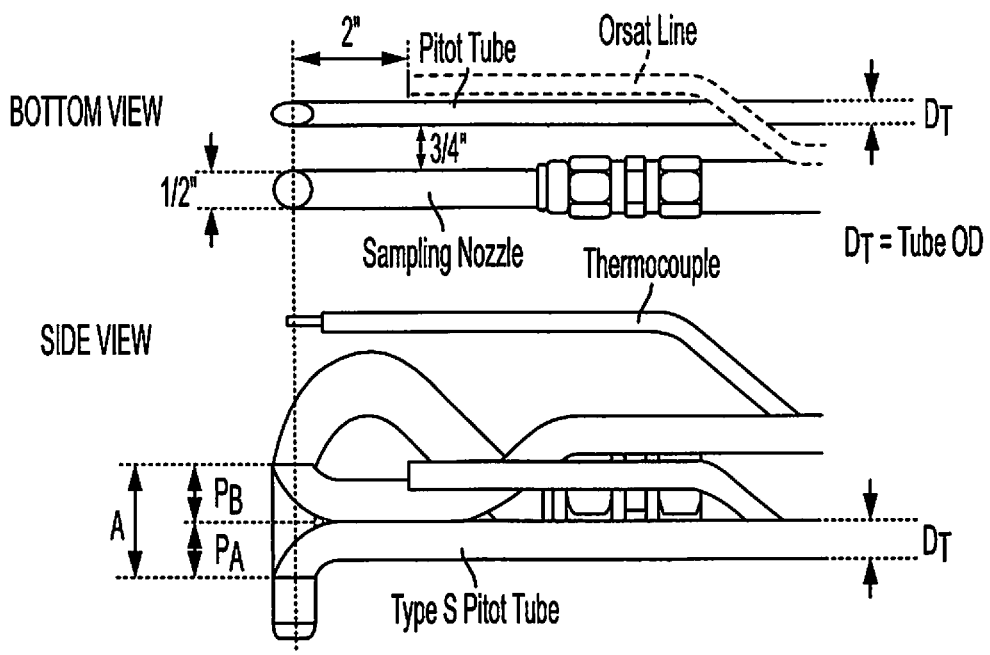
FIGS. 1B-1C are an example of factory-accepted tests for s-type pitot tubes that require a vise (not shown) to hold the tube, a known flat plane, and a protractor. The collected data are then inputted into an accompanying spreadsheet for the required calculations.
Figure 1C:
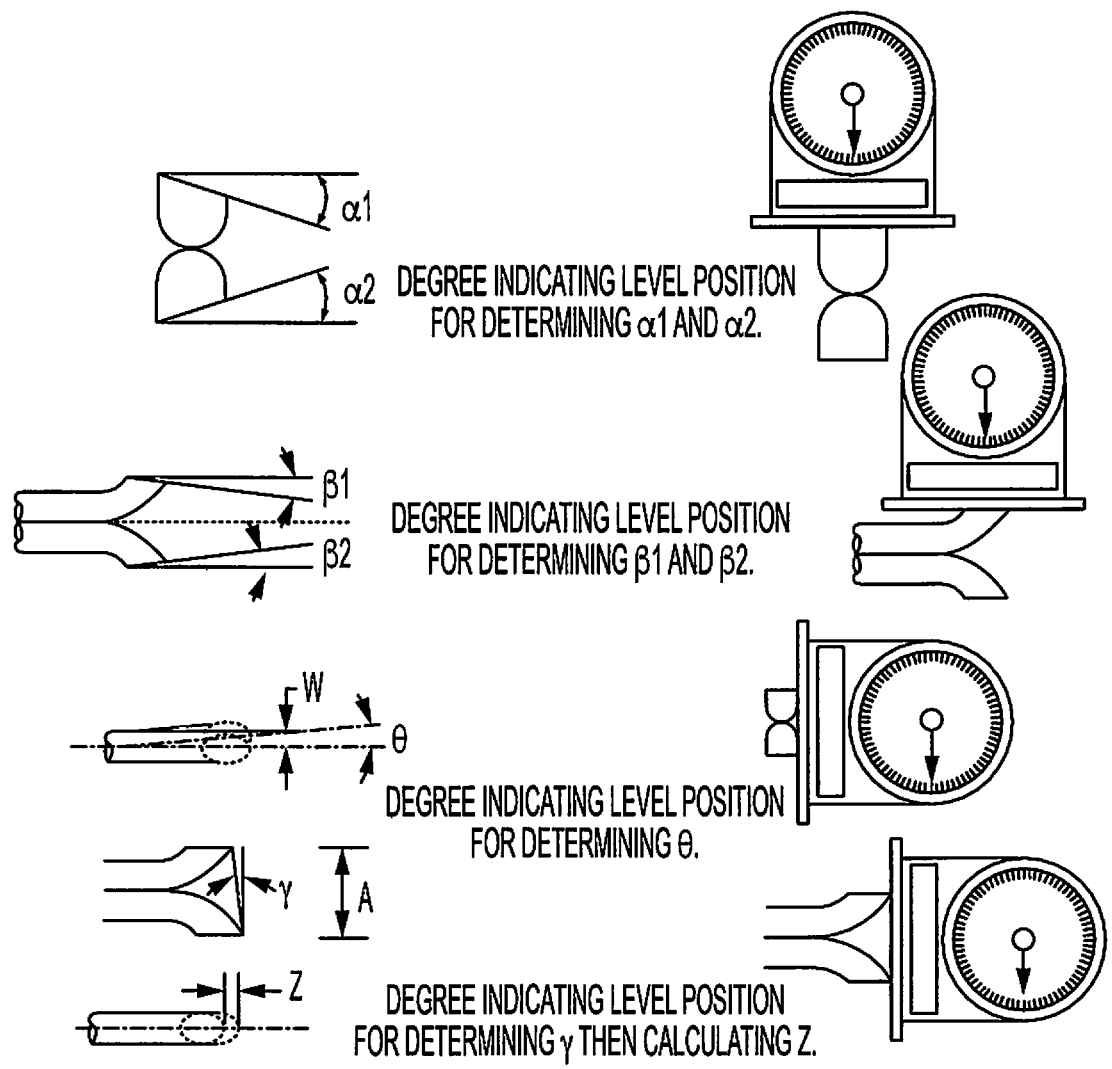

By way of a non-limiting example, the first measurement position 10 may include a first and a second recess 11, 21 of the block 90 arranged coaxial one another on a centerline 29 and spaced apart from one another by an inter-tube spacing distance S. See FIG. 1. In some embodiments the first recess 11 is a lower recess located on a bottom face surface 93B of the block 90 and the second recess 21 is an upper recess located in part on an end face surface 91B orthogonal to that of the bottom face surface 93B. The first recess 11 may include an arcuate shaped upper end 15 and a planar lower end 13 on which to rest a face-opening plane $P_A$, $P_B$ of the leg A, B inserted into the recess 11. When in use, the face-opening $P_A$, $P_B$ that is located within the recess 11 should be kept parallel with the planar lower end 13. The second recess 21 may have an open upper end 25 and provide a planar lower end 23 on which to rest a tubing of leg A, B inserted into it. A total distance or height H1 between the planer lower ends 13 and 23 may span dimension D and S. See FIG. 1A.

Figure 18:
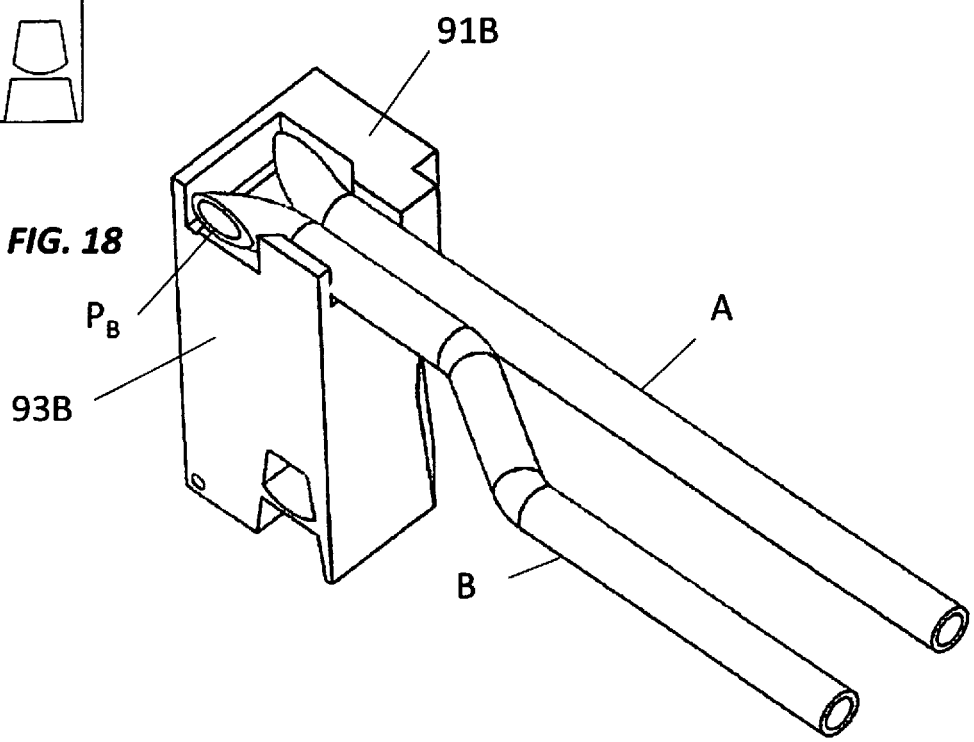
FIG. 18 is a rear/bottom/left isometric view of the gauge of FIG. 15 with the s-type pitot tube inserted into the third measurement position.
Figure 19:
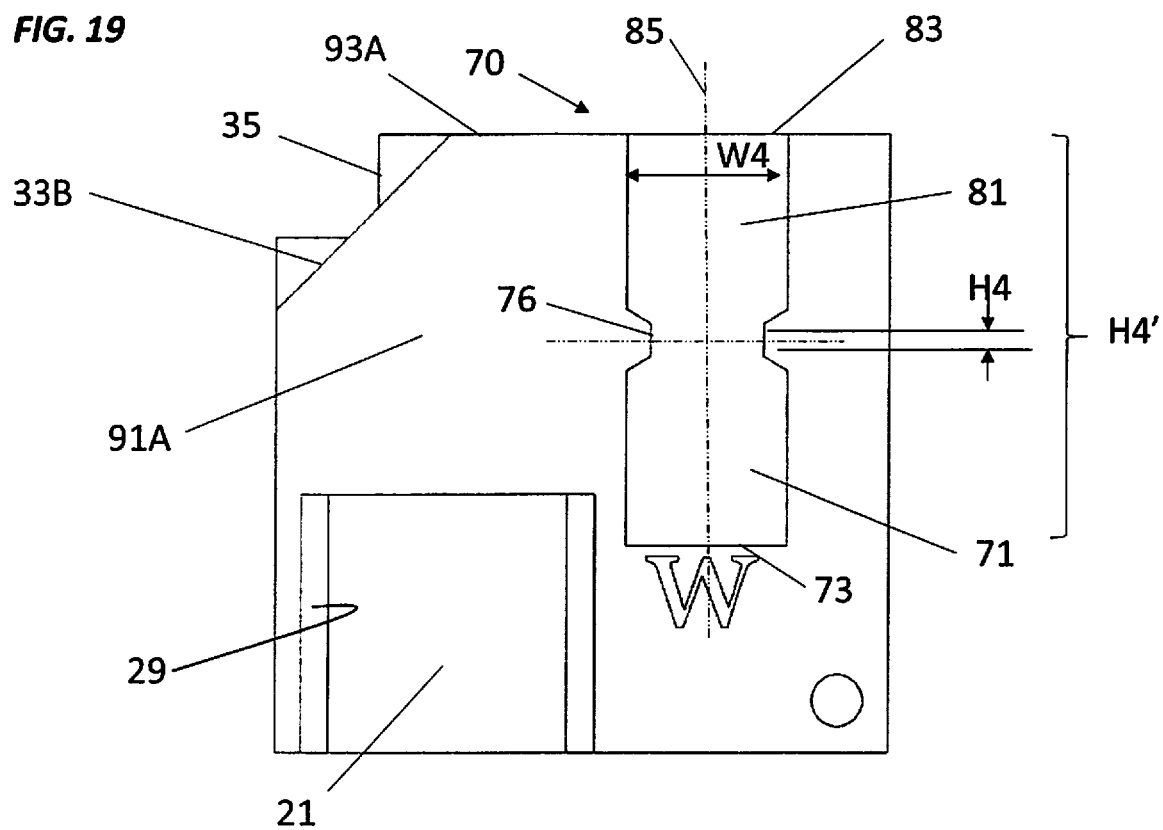
FIG. 19 is a rear elevation view of the embodiment of FIGS. 3-5. A fourth measurement station or position is used to verify whether a fourth face-opening feature of the s-type pitot tube is within the tolerance W, see FIG. 2G, by providing a tube insertion location where the s-type pitot tube will not be able to fit if outside of tolerance.
Figure 20:
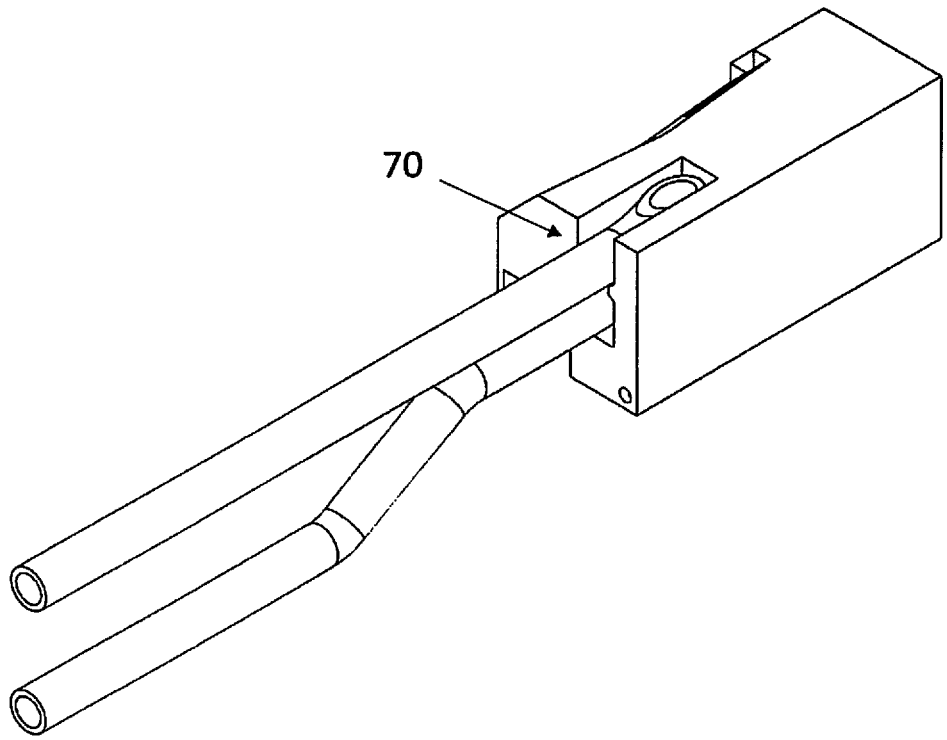
FIG. 20 is a front/top/right isometric view of the gauge of FIG. 19 with an s-type pitot tube inserted into the fourth measurement position.

The sidewalls 19, 29 of each recess 11, 21 have a taper equal to $\alpha$. See e.g. FIG. 18. If the planes $P_A$ or $P_B$ fall outside of tolerance, one port end or both will not fit into the second recess 21 when leg A (or leg B) is within the first recess 11 and its respective planar face-opening $P_A$, $P_B$ is resting on and parallel to the planar lower end 13. A minimum width W1 of the first recess 11 at its planar lower end is W, see FIG. 1A.

Figure 2C:
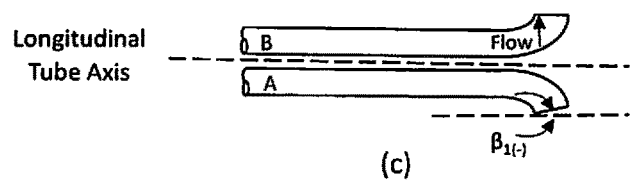
Figure 2D:
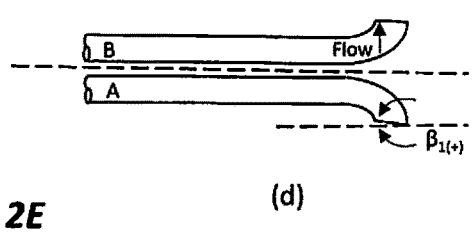
Figure 2E:
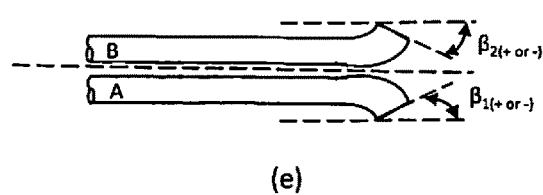

Referring now to FIGS. 3-5 and 10-15, a second measurement station or position 30 is used to verify whether a second face-opening feature of the s-type pitot tube is within the tolerance $\beta_1$ and $\beta_2$, see FIGS. 2C-2E, by using a gauge surface 33. When in use, an s-type pitot tube is positioned above the gauge surface 33 so that a first face-opening plane $P_A$ (or $P_B$, see FIG. 1A) is checked and then a second face-opening plane $P_B$ (or $P_A$) is checked relative to the gauge surface 33.

By way of a non-limiting example, the second measurement position 30 may include a first and a second gauge surface 33A, 33B, with one portion of each gauge surface 33 being located on a different face surface 93A, 95A than another portion of the gauge surface 33. The surfaces 33A, 33B are flat planer surfaces each having a slope $\beta$, a minimum width W2 greater than that of the tube outside diameter, a length L2 at least greater than a length of the tube between a start of its bend and its port end, and. In some embodiments, $\beta$ is 5°, with the surfaces 33A, 33B sloping downward toward one another. The surfaces 33A, 33B may be spaced apart by a flat planar surface 35. In other embodiments, $\beta$ is in a range of 4° to 5°. The actual manufacturable angle may vary from the target angle within generally accepted tolerance or measurement limits. For example, the manufacturable angle may be 4.25° in order to approximate an angle $\beta$ of about 5°.

A guide 31 may be located at a forward end of one of the surface 33 and arranged coaxial along a centerline 39 of the surface 33 to place the face-opening plane $P_B$ (or $P_A$) in proper relation to the surface 33. The guide 31 may include a first and second wall surface 37A, 37B arranged orthogonal to one another.

The gauge surfaces 33A, 33B are used to compare the outermost acceptable angle (as defined by $\beta$) to the angle presented by the face $P_A$, $P_B$ of the s-type pitot tube. In some embodiments, gauge surface 33A may correspond to tolerance $\beta_{1(-)}$ and gauge surface 33B may correspond to tolerance $\beta_{1(+)}$. With leg A or B of the s-type pitot tube resting on the guide 31, the leg A or B is moved axially along its longitudinal axis toward or away from the gauge surfaces 33A, 3B. An angle of the face-opening $P_A$, $P_B$ is then visually compared to that of the opposing gauge surface 33A, 33B. If the face-opening planes $P_A$ or $P_B$ pass the tolerance $\beta_1$, see FIGS. 2C & 2D, then the planes $P_A$ or $P_B$ pass the tolerance $\beta_{2(+\ or\ -)}$, see FIG. 2E.

Figure 2F:
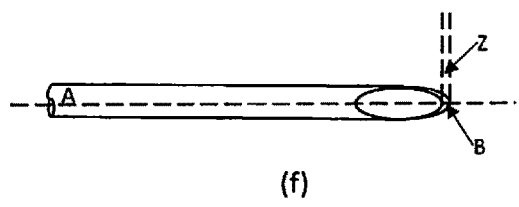

Referring now to FIGS. 3-5 and 15-18, a third measurement station or position 50 may be used to verify whether a third face-opening feature of the s-type pitot tube is within tolerance Z, see FIG. 2F, by using a holding jig 53 that places the tube in proper position and an indicator line 59 to determine whether the port ends of the legs A, B are in alignment with one another. By placing the s-type pitot tube in the jig 53, a user can check if the two legs A, B are too far out of alignment to meet the accepted criteria.

By way of a non-limiting example, the third measurement position 50 may locate the holding jig 53 is located along a centerline 65 of the recess toward a first end 55 of a recess 51. The indicator line 59 is arranged perpendicular the centerline 65 located toward a second end 57 of the recess 51 and spaced a distance Z from the second end 57. In some embodiments, Z is ⅛ inch. In other embodiments, Z is in a range of 0.12 to 0.13 inches. The actual manufacturable distance may vary from the target distance within generally acceptable tolerance or measurement limits. For example, in some embodiments the manufacturable distance may be 0.12 inches to approximate a distance of ⅛ inch. The recess 51 may be located on an end face surface 91B of the block 90, with the recess 51 presenting an opening 61 on an end face surface 91B and an open sidewall portion 63 located on a side face surface 93B. The opening 61 allows for placement of the tube onto the holding jig 53 and the open sidewall portion 63 allows for visual inspection of the tube to determine whether the ends of the tube lie at or above the indicator line 59.

The recess 51 may be shaped complementary to that of the tube so that when an s-type pitot tube is located in the holding jig 53, a first width W3 of the first end 55 accommodates a distance spanning twice the width $W_L$ of the leg plus the inter-tube spacing S. A second width W3' at the second end 57 of the recess 51 accommodates a port-to-port distance of the tube. See FIG. 1A. An overall depth D3 of the recess 51 is at least equal that of the leg width $W_L$.

Figure 2G:
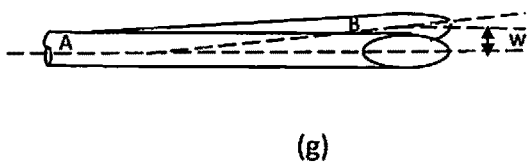

Referring to FIGS. 3-5, 19 and 20, a fourth measurement station or position 70 is used to verify whether a fourth face-opening feature of the s-type pitot tube is within the tolerance W, see FIG. 2G, by providing a tube insertion location where the s-type pitot tube will not be able to fit if outside of tolerance. In other words, this fourth measurement position 70 is verifying longitudinal alignment of the legs A, B.

By way of a non-limiting example, the fourth measurement position 70 may include a first and a second recess 71, 81 located on an end face surface 91A of the block 90 and sharing a common centerline 85 with one another. The first recess 71 may be a lower recess and have a flat planar lower end 73. The second recess 81 may be an upper recess and have an open upper end 83 along face surface 93A. Located between the two recesses 71, 81 is a narrower waist portion 76 having a height H4 at least equal to an inter-tube space S. See FIG. 1A. A width W4 of the recesses 71, 81 is at least equal to a width of the leg $W_L$ plus the tolerance W. In some embodiments, W is 1/32 inch (0.08 cm). In some embodiments, W is in a range of 0.025 to 0.035 inches. The actual manufacturable alignment may vary from the target within generally acceptable tolerance or measurement limits. A total distance or height H4' between the lower end 73 and upper end 83 may span the port-to-port dimension and inter-tube spacing S. See FIG. 1A.

While embodiments have been described in detail sufficient for persons of ordinary skill in the art, modifications may be made without departing from the scope of the following claims, including the full range of equivalents to which each recited claim element is entitled.

The invention claimed is:

1. An s-type pitot tube verification gauge comprising:
   a block containing at least two different measurement stations;
   a first of the at least two different measurement stations configured to gauge a face-opening plane tolerance of an s-type pitot tube; and
   a second of the at least two different measurement stations configured to gauge a leg alignment tolerance of the s-type pitot tube.

2. The s-type pitot tube verification gauge of claim 1, wherein the face-opening plane tolerance is an angle $\alpha$ relative to a transverse axis of a first and a second leg of the s-type pitot tube.

3. The s-type pitot tube verification gauge of claim 2, the first measurement station comprising:
   a first and a second recess spaced apart from one another and sharing a common centerline;
   each said recess having a minimum width $W_L$ and including:
      an upper end;
      a flat planar lower end; and
      a tapered sidewall extending between the upper and lower ends at the angle $\alpha$;
   wherein $W_L$ is equal to a predetermined standard outside diameter of each leg of the s-type pitot tube.

4. The s-type pitot tube verification gauge of claim 3, wherein the first recess is located on a first face surface of the block and an upper end of the second recess is located on a second face surface of the block orthogonal to the first face surface.

5. The s-type verification gauge of claim 2, wherein the angle $\alpha$ is in a range of 9° to 10°.

6. The s-type pitot tube verification gauge of claim 1, wherein the face-opening plane tolerance is an angle $\beta$ relative to a longitudinal axis of a first and a second leg of the s-type pitot tube.

7. The s-type pitot tube verification gauge of claim 6, the first measurement station comprising:
   a first and a second planar surface spaced apart from one another and sharing a common centerline, each said planar surface sloping toward one another at the angle $\beta$; and
   a leg guide located at an end of one of said planar surfaces and sharing the common centerline of said planar surfaces.

8. The s-type pitot tube verification gauge of claim 7, wherein one portion of the first and second planar surfaces is located on a first face surface of the block and another portion of the first and second planar surfaces is located on a second face surface of the block orthogonal to the first face surface.

9. The s-type pitot tube verification gauge of claim 6, wherein the angle $\beta$ is in a range of 4° to 5°.

10. The s-type pitot tube verification gauge of claim 1, wherein the leg alignment tolerance is a port end alignment tolerance Z.

11. The s-type pitot tube verification gauge of claim 10, the second measurement station comprising:
   a recess including:
      a holding jig located along a centerline of the recess toward a first end of the recess; and
      an indicator line located perpendicular to the centerline toward a second end of the recess and spaced from the second end a distance equal to the port end alignment tolerance Z;
   wherein a width of the recess at the first end is at least equal to twice a predetermined standard outside leg diameter $W_L$ plus a predetermined standard inter-leg spacing S; and
   wherein a width of the recess at the second end is at least equal to a predetermined standard port-to-port distance.

12. The s-type pitot tube verification gauge of claim 11, wherein the recess is located on a first face surface of the block.

13. The s-type verification gauge of claim 12, wherein one side of the recess includes an opening located on a second face surface of the block orthogonal to the first face surface, the opening being toward the second end of the recess and spanning from the second end at least the distance equal to the port end alignment tolerance Z.

14. The s-type verification gauge of claim 11, wherein the port end alignment tolerance Z is in a range of 0.12 inches to 0.13 inches.

15. The s-type pitot tube verification gauge of claim 1, wherein the leg alignment tolerance is a longitudinal axis alignment tolerance W.

16. The s-type pitot tube verification gauge of claim 15, the second measurement station comprising:
   a first and a second recess spaced apart from one another and sharing a common centerline, at least one of the recesses having a flat planar first end;
   wherein a height of each said recess is equal to a predetermined standard distance D, where D is the predetermined standard port-to-port dimension plus ½ a predetermined standard inter-tube spacing S; and wherein a width of each said recess is at least equal to a predetermined standard outside diameter $W_L$ of a leg plus the longitudinal axis alignment tolerance W.

17. The s-type pitot tube verification gauge of claim 16, wherein the recess is located on a first face surface of the block.

18. The s-type pitot tube verification gauge of claim 17, wherein a second end of at least one of the first and second recesses is an open end located along a second face surface of the block orthogonal to that of the first face surface.

19. The s-type pitot tube verification gauge of claim 15, wherein the longitudinal axis alignment tolerance W is about 0.025 to 0.035 inches.

20. The s-type pitot tube verification gauge of claim 1, wherein the block is rectangular.

21. A s-type pitot tube verification gauge comprising:
a block containing a first, a second, a third, and a fourth measurement station;
the first measurement station configured to gauge a first face-opening plane tolerance of a s-type pitot tube, the first face-opening plane tolerance being an angle α relative to a transverse axis of a first and a second leg of a s-type pitot tube, the first measurement station comprising:
a first and a second recess spaced apart from one another and sharing a common centerline;
the first and second recesses having a minimum width $W_L$ and including:
an upper end;
a flat planar lower end; and
a tapered sidewall extending between the upper and lower ends at the angle α;
wherein $W_L$ is equal to a predetermined standard outside leg diameter;
the second measurement station configured to gauge a second face-opening plane tolerance of the s-type pitot tube, the second face-opening plane tolerance being an angle β relative to a longitudinal axis of the first and the second leg of the s-type pitot tube, the second measurement station comprising:

a first and a second planar surface spaced apart from one another and sharing a common centerline, each said planar surface sloping toward one another at the angle β; and
a leg guide located at an end of one of said planar surfaces and sharing the common centerline of said planar surfaces;
the third measurement station configured to gauge a first leg alignment tolerance, the first leg alignment tolerance being a port end alignment tolerance Z, the third measurement station comprising:
a recess including:
a holding jig located along a centerline of the recess toward a first end of the recess; and
an indicator line located perpendicular to the centerline toward a second end of the recess and spaced from the second end a distance equal to the port end alignment tolerance Z;
wherein a width of the recess at the first end is at least equal to twice the predetermined standard outside leg diameter $W_L$ plus a predetermined standard inter-leg spacing S; and
wherein a width of the recess at the second end is at least equal to a predetermined standard port-to-port distance;
the fourth measurement station configured to gauge a second leg alignment tolerance, the second leg alignment tolerance being a longitudinal axis alignment tolerance W, the fourth measurement station comprising:
a first and a second recess spaced apart from one another and sharing a common centerline, at least one of the first and second recesses of the fourth measurement station having a flat planar first end;
wherein a height of each first and second recess of the first and second recesses of the fourth measurement station is equal to a predetermined standard distance D, where D is a predetermined standard port-to-port dimension plus ½ a predetermined standard inter-tube spacing S; and
wherein a width of each first and second recess is at least equal to the predetermined standard outside leg diameter $W_L$ plus the longitudinal axis alignment tolerance W.

* * * * *